Figure 3:
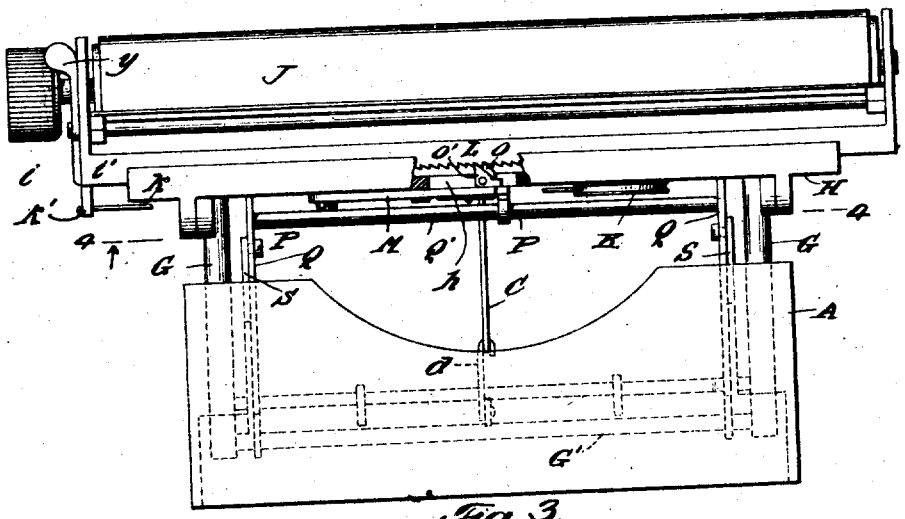

F. S. ROSE, DEC'D.
CORONA TYPEWRITER COMPANY, INC., ASSIGNEE.
ESCAPEMENT MECHANISM FOR TYPE WRITERS.
APPLICATION FILED MAY 22, 1915.
Reissued June 22, 1915.
13,935.
3 SHEETS—SHEET 1.
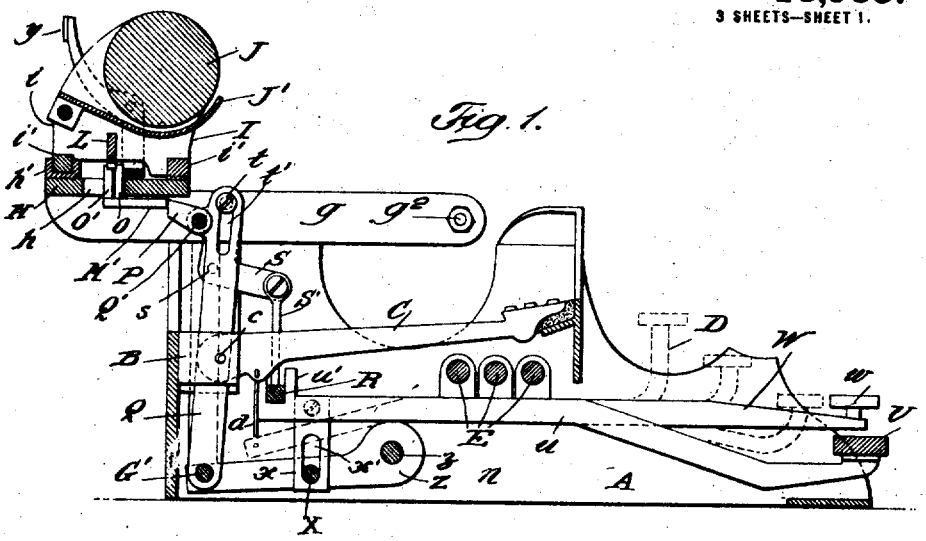
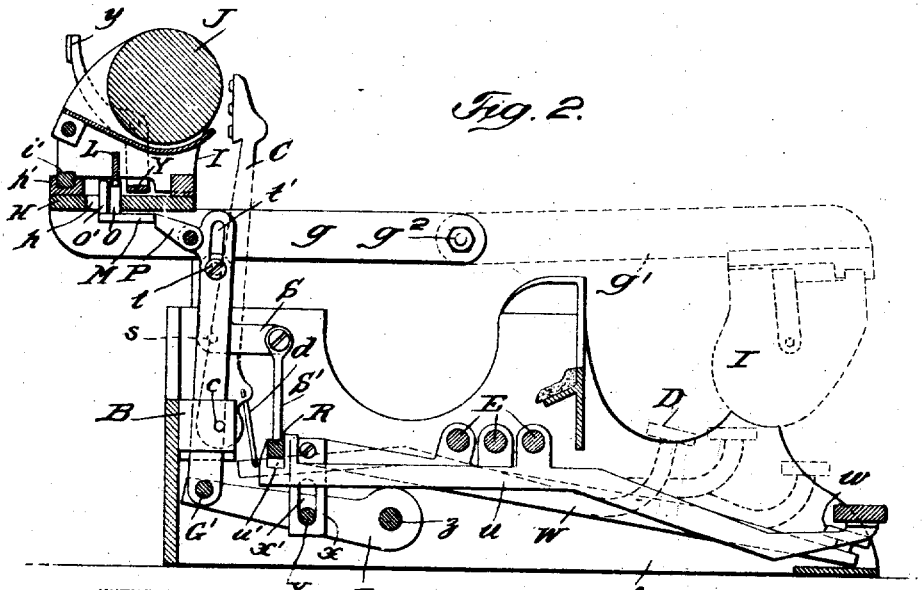
WITNESSES:
Julius A. Pratt
C. Bartels
INVENTOR
Frank S. Rose, Deceased
Corona Typewriter Company, Assignee
BY
Criswell & Criswell
ATTORNEYS

F. S. ROSE, DEC'D.

CORONA TYPEWRITER COMPANY, INC., ASSIGNEE.

ESCAPEMENT MECHANISM FOR TYPE WRITERS.

APPLICATION FILED MAY 22, 1915.

Reissued June 22, 1915.

13,935

3 SHEETS—SHEET 2.

WITNESSES:

Juliet H. Hay

C. Baitels

INVENTOR

Frank S. Rose, Deceased

Corona Typewriter Company, Inc. Assignee

BY

Criswell & Criswell

ATTORNEYS

F. S. ROSE, DEC'D.
CORONA TYPEWRITER COMPANY, INC., ASSIGNEE.
ESCAPEMENT MECHANISM FOR TYPE WRITERS.
APPLICATION FILED MAY 22, 1915.
Reissued June 22, 1915.
13,935.
3 SHEETS—SHEET 3.
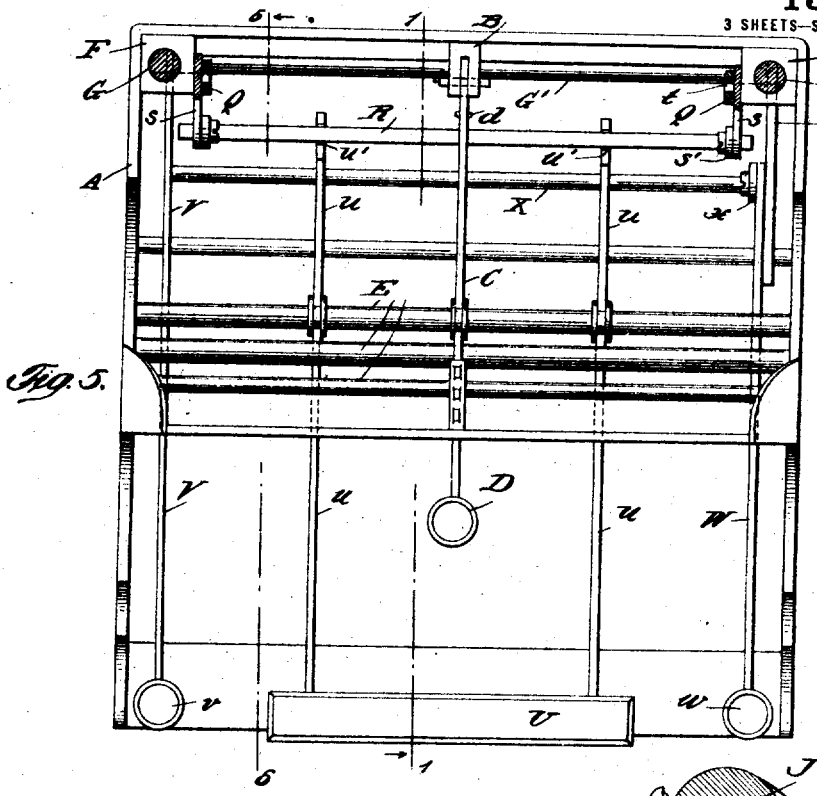
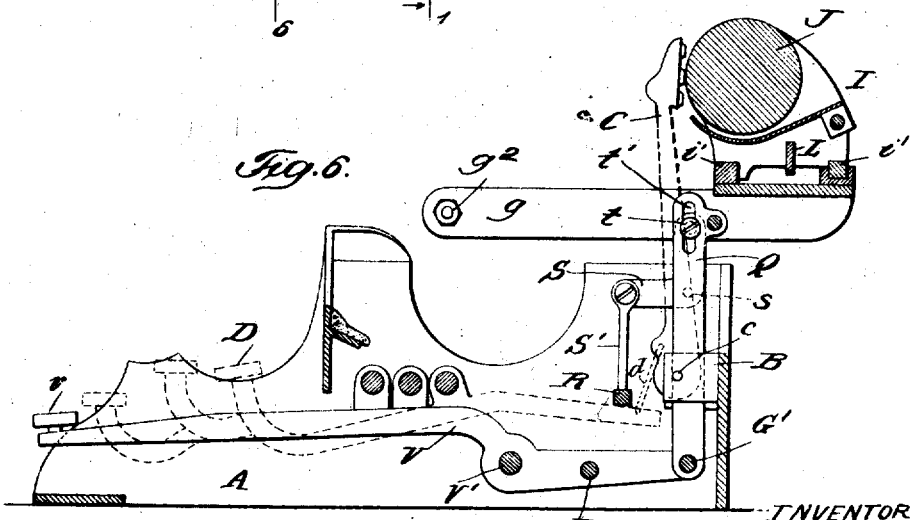
WITNESSES:
Juliana H. Kurtz
C. Bartels
INVENTOR
Frank S. Rose, Deceased
Corona Typewriter Company Inc. Assignee
By Crisw. & Crisw. ATTORNEYS

UNITED STATES PATENT OFFICE.

FRANK S. ROSE, DECEASED, LATE OF NEWARK, NEW JERSEY, BY CORONA TYPEWRITER COMPANY, INC., OF GROTON, NEW YORK, ASSIGNEE.

ESCAPEMENT MECHANISM FOR TYPE-WRITERS.

13,935. Specification of Reissued Letters Patent. Reissued June 22, 1915.

Original No. 943,553, dated February 8, 1910, Serial No. 256,244. Application for reissue filed May 22, 1915. Serial No. 29,762.

*To all whom it may concern:*

Be it known that the CORONA TYPEWRITER COMPANY, INC., a corporation organized and existing under the laws of the State of New York, United States of America, assignee by assignment of FRANK S. ROSE, deceased, late a citizen of the United States and a resident of Newark, in the county of Essex and State of New Jersey, makes application for certain new and useful Improvements in Escapement Mechanism for Type-Writers, invented by the said FRANK S. ROSE, of which the following is a specification.

The invention relates to an "escapement mechanism for typewriters."

In the present invention the object is to provide a mechanism for controlling the step-by-step feed of a platen-carriage which is adapted to be folded relatively to the keys, or a keyboard, or the type-bars of a front strike typewriter.

One example of a typewriter with a foldable platen-carriage is disclosed by United States Letters Patent No. 754,242, granted to the said Frank S. Rose on March 8, 1904.

Broadly speaking, the invention consists of an escapement mechanism for a foldable or adjustable platen-carriage wherein certain parts of said mechanism remain in position for action at all times by the keys of the typewriter, and other parts of said mechanism are shiftable or movable with the platen carriage when the latter is folded relatively to the keys or the type-bars. Said parts of the escapement mechanism which are shiftable with the foldable carriage act in conjunction with the spacing rack to hold the carriage in place against the pull of the tension spring, and, furthermore, these parts are so combined with the non-adjustable key-actuated parts as to be brought into coöperative relation thereto on the return of the platen carriage to its normal working position.

This invention further consists in the novel construction and combination of parts as will be hereinafter fully described and claimed.

Reference is to be had to the accompanying drawings, forming a part of this specification wherein like characters of reference are used to indicate corresponding parts in all the figures.

Figure 4:
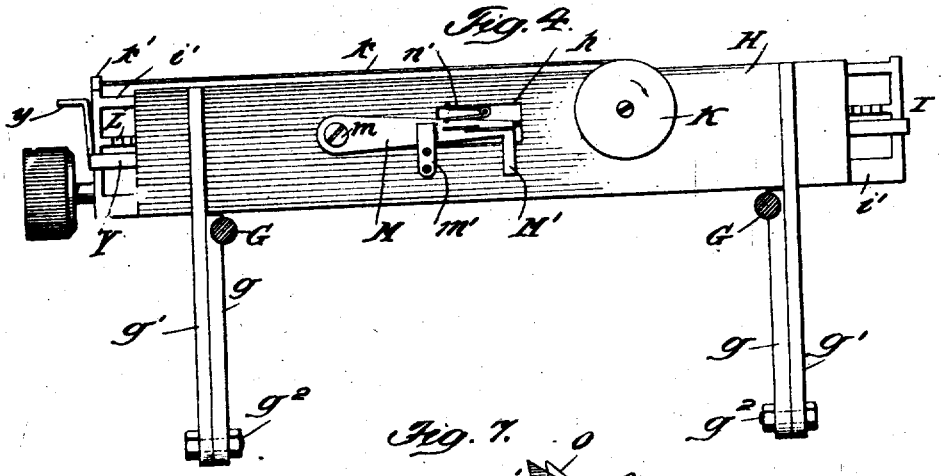
Figure 7:
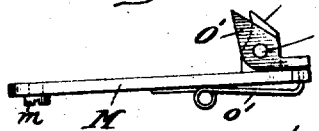

Figure 1 is a vertical section elevation taken in the plane indicated by the dotted line 1—1 of Fig. 5, looking in the direction of the arrow, and showing the platen carriage with its supporting means in their normal working positions. Fig. 2 is a sectional elevation similar to Fig. 1, with the platen carriage raised to the limit of its extreme upper adjustment for the purpose of writing with the numerals and punctuation characters, the dotted lines showing the folded position of the platen carriage with respect to the keyboard. Fig. 3 is a rear elevation of the typewriter, parts being broken away and in section. Fig. 4 is a horizontal sectional view taken in the plane of the dotted line 4—4 of Fig. 3, looking upward in the direction of the arrow and showing the bed of the platen carriage together with the dog carrier of the escapement mechanism and the tension device for giving the traveling movement to the platen carriage. Fig. 5 is a sectional plan view, the plane of the section being indicated by the dotted line 4—4 of Fig. 3, looking downward. Fig. 6 is a sectional elevation taken in the plane of the dotted line 6-6 of Fig. 5, looking in the direction of the arrow, and showing the platen carriage adjusted to an intermediate position between the two positions indicated by Figs. 1 and 2, respectively. Fig. 7 is a detail perspective view of the dog carrier with the escapement dogs thereon.

The frame A may be of any suitable or preferred construction. The back part of the frame is provided with a sector consisting of the individual members B, in which are hung the type-bars C, by means of the pins *c*, said type-bars being arranged to fold to the substantially horizontal positions indicated by Fig. 1, somewhat similar to the well known style of front-strike machines. In machines of this class it is customary to mount the type-bars for movement on horizontal axes, and to allow them to fold downwardly into horizontal positions below and away from the platen carriage, in order to expose the work on the latter. The type-bars B are actuated individually by separate key-levers indicated by dotted lines at D in the drawings, said key-levers being underhung on suitable horizontal rods E mounted within the frame A. The key-levers are constructed and arranged in banks, and each lever is connected by a link *d* with the appropriate type-bar C.

In the rear corners of the frame A are provided the vertical guides F. These guides are shown by Fig. 5 in the form of posts having openings extending therethrough, although the special form of guides is not material. Said openings of the guides F accommodate the vertical sliding stems G, for the bed H of the platen carriage I. This bed H is adjustable or foldable with the platen carriage into a compact relation to the keyboard or to the type-bars of the new typewriter, but as shown herein, said bed and the platen carriage are adapted to be adjusted into overlying or overhanging relation to the keyboard, see dotted lines in Fig. 2, thereby disposing the platen carriage in exceedingly compact relation to the other parts of the machine for convenience in transportation. To secure this folding adjustment of the carriage bed to the platen carriage, the vertical movable stems G are represented as being provided with horizontal arms *g*, the latter being fixed rigidly to the stems and extending outwardly from the same over the type-bars C. The carriage H is fastened rigidly to other horizontal arms *g'*, which are disposed parallel to the arm *g* and are connected pivotally therewith in a suitable way as, for example, by pins or bolts $g^2$, see Fig. 4. It is evident that the carriage bed G is movable or shiftable with the arms *g'* when the latter are turned on the pivots $g^2$, in order to assume the dotted position of Fig. 2, or the full line positions shown by Figs. 1, 2 and 6 of the drawings. The lower ends of the stems G extend below the guides F, as indicated by dotted lines in Fig. 3, said lower ends of the stems G being connected by a horizontal bar or rod G', which is attached rigidly to said lower ends of the stems and lies within the back of the frame A.

The carriage bed H may be of any suitable or preferred construction, but as herein shown, it consists of a simple flat plate fastened rigidly to the arms *g'*. Said bed is provided at its middle with a slot *h*, and on the rear edge of the bed is a guideway *h'* having any suitable form in cross-section. The platen carriage I may also be of any suitable or preferred construction, with a view to supporting a rotary platen or type cylinder J, as well as the various other parts required for operating the platen in the manner well known to the art. As shown, the platen carriage consists of the end plates *i*, which are joined at their front and rear edges by rails *i'*, the front rail being adapted to rest directly upon the carriage bed H while the back rail is fitted in the guide *h'*, so as to have endwise travel therein. The end plates of the carriage frame support a paper clamp J', which extends longitudinally of the platen carriage and has a section thereof curved to conform to the platen J, thereby disposing it into coöperative relation to the platen for the purpose of confining the paper in the carriage. This paper clamp, however, may be modified within wide limits.

The carriage I is drawn normally in one direction by an appropriate tension mechanism, which, however, does not form a part of this invention. As illustrative of a suitable type of this tension mechanism, the carriage bed H is shown as provided with a spring actuated drum or spool K, see Fig. 4. This drum is mounted on the under side of the carriage bed for rotation thereon under the energy of its spring, and to the drum is connected a cord or strap *k*, which is anchored at its free end to a corner of the platen carriage I, as at *k'*, whereby the drum is adapted to draw the platen carriage in the required direction. This platen carriage is limited to endwise movement directly in a rectilinear path by the described form of guide devices which are employed between the platen carriage and the carriage bed, and said carriage is given a step-by-step feed movement by the operation of an escapement mechanism, which is adapted to be actuated by the type-bar keys or by the spacing keys of the typewriter, as will presently appear.

A front-strike typewriter employing a foldable or shiftable platen carriage substantially of the class disclosed by the patent herein referred to and represented by the drawings hereto attached, requires an escapement mechanism of a novel construction in order to fulfil the conditions of practical service. This escapement mechanism must coöperate with the platen carriage when the latter is raised or adjusted vertically to a plurality of different positions, in order to write the several characters, such as the lower case letters, the upper case letters, the punctuation marks and the numerals. Said escapement mechanism must also permit of the adjustment of the carriage bed to the platen carriage to the required folded or unfolded positions without taking the machine apart or dismantling the working parts thereof, and the parts of the escapement mechanism must be brought into coöperative relation to each other when the carriage bed and the platen carriage are returned to their normal working positions.

In the drawings accompanying this application one type of escapement mechanism is shown which fulfils these conditions, and the same will now be described in detail. An element of this escapement mechanism is a horizontal bar L ranging lengthwise of the carriage and attached thereto, partaking of the endwise movement thereof, said bar being provided with a series of teeth forming a rack. Another element of said escapement mechanism is a dog carrier represented more clearly by Figs. 4 and 7. Said carrier is shown as a flat plate or arm M, arranged preferably on the under side of the carriage bed H, to which it is connected pivotally in a suitable way, as for example, by the vertical pin or screw *m*. The dog carrier is prevented from folding or dropping out of place by a keeper *m'*, fixed to the carriage bed H, and the free end of said dog carrier is arranged to extend across the slot *h* in the carriage bed. This dog carrier is provided with two dogs O O', the dog O being fixed to or integral with the otherwise free end of the carrier M, and extending upwardly therefrom, through the slot *h*, so as to have engagement normally with the tooth of the rack bar L. The dog constitutes what may be termed the "fixed dog", although it is capable of movement with the dog carrier. The other dog O' is disposed alongside of the fixed dog O, to which it is connected pivotally as at *o*, and against the toe of this pivoted dog O' acts as a spring *o'* the latter being attached to the dog carrier M, and operating to hold the dog O' normally out of registration or alinement with the fixed dog O. The two dogs are mounted on the carrier M, so as to have movement therewith, although the pivoted dog O' has movement on its axis *o* independently of its movement with the carrier. The carrier M is held in a normal position by a spring *n'* mounted on the carriage bed and acting to hold the carriage and the dog O in position for the latter to engage with a tooth of the rack, but in the action of the machine the carrier is operated against the tension of its spring *n'*, so as to withdraw the dog O from the rack and place the pivoted dog O' in position for engagement with the next tooth of the rack, thereby checking the movement of the platen carriage under the action of the tension device and operating to regulate the movement of said platen carriage with the required step-by-step feed for the purpose of spacing the impressions of the letters or printing characters in the manner well understood by those skilled in the art.

Another member of the escapement mechanism is a tappet P, which coöperates with the dog carrier M and is associated with means whereby it may be operated by any one of the type-bar keys or the spacing key, said tappet being also associated with the means for shifting the platen carriage in order that it may remain in coöperative relation to said dog carrier.

The tappet P is represented in the form of a short arm arranged below the carriage bed and normally in coöperative relation to a toe piece M' of the dog carrier. This tappet is carried by a rocking and shifting frame which is herein shown as consisting of the upright members Q and a cross member or rod Q', see Figs. 3 and 5. The upright members or parts Q of this frame are disposed alongside of the guides F, and they are connected loosely at their lower ends to the cross bar or rod G', which connects with the vertical slidable stems G, the latter carrying the carriage bed H as heretofore described, whereby the frame is adapted to be adjusted vertically with the stems G and the carriage bed. Instead of connecting the members Q of the rocking frame loosely to the cross bar or rod G', said members may be fastened rigidly to said rod and the rod mounted loosely in the stems G, so as to rock or turn therein with said frame. The members Q of said frame are connected by the cross member Q', and on the middle part of this cross member is secured the tappet P, the latter being adapted to rock with the frame on the center afforded by the rod G', in order to actuate the dog carrier when the frame is rocked.

The means for rocking the frame consists of a universal bar R adapted for actuation by either of the key-levers or the spacing key, and suitable bell cranks S. The bell cranks are disposed at the sides of the machine between the guides F and the upright members Q of the rocking frame, each bell crank being fulcrumed at its knee by a pin *s*, or its equivalent, attached to one of the guides F. The horizontal arms of the bell cranks are connected by links S' with the end portions of the universal bar R, but the vertical arms of said bell cranks have slidable connection with the upright members Q of the rocking frame. This slidable connection between said rocking frame and the bell cranks is secured by providing pins or screws *t* on the vertical arms of the bell cranks, and by making longitudinal slots *t'* in the upper ends of the upright members Q of the rocking frame. The pins or screws *t* connect the bell cranks with the rocking frame, so as to actuate the latter when the universal bar R is operated by any one of the keys, while the slots *t'* permit the rocking frame to be raised or lowered with the platen carriage without disengaging the operative connection between the bell cranks and said frame thus insuring the operation of the dog by the tappet at any point in the elevation of the platen carriage.

The spacing key consists of the arms *u* and the pressure piece U, the latter being arranged at the front of the keyboard, and the arms *u* extending rearwardly to the universal bar. These arms are provided with notches *u'*, forming yokes in which the universal bar is snugly seated, and this bar is adapted to be moved bodily in a vertical plane by the arms of the spacing key, although said universal bar is capable of a limited movement in said yokes of the arms *u*, without, however, disengaging said universal bar from the yokes of the spacing key arms. The arms of the spacing key are hung loosely from one of the rods E, and this spacing key is practically a lever, upon the depression of which the universal bar R is operated to actuate the tappet P through the bell cranks S, the rod Q' and the rocking frame. The universal bar R extends across and lies close to the rear ends of the key-levers D, and this bar is adapted to be actuated by any one of the key-levers in the operation of the machine.

Different key-levers for shifting the platen carriage vertically and to different points are employed as shown by Figs. 2 and 6 for permitting the upper case characters and punctuation marks and numerals to be printed on the platen. One of said shifting levers is indicated at V, arranged at one side of the frame and provided with a finger piece *v*. This lever is fulcrumed at a point intermediate of its length on a rod V', see Fig. 6, and the rear end of the lever is connected with the rod G', the latter uniting the sliding stems G on the platen carriage. The other shifting lever W operates to lift the platen carriage to its highest position, said lever being located on the other side of the frame and it is provided with a finger piece *w*, said lever W being hung at a point intermediate of its length on one of the rods E. This lever is provided at its rear end with a plate or hanger *x*, having a slot *x'*, and through this slot passes a rod X, one end of which is fastened to the lever V, and the other end is attached to a short lever Z. Said short lever lies alongside of the lever W, to which it is connected by the rod X, and the hanger *x*, and this short lever is pivoted as at *z* on the machine frame, its other end being loosely connected with the rod G of the vertically sliding stems for the platen carriage. It will be seen that the lever V is adapted to act directly on the rod G' for raising the stems G and the platen carriage to the position indicated by Fig. 6, the rod X being arranged to play in the slot of the hanger *x*, so as not to disturb the other lever W. This last mentioned lever W when depressed raises the hanger *x* and the rod X, the latter working the levers V and Z, so as to raise the rods G and the platen carriage to the position indicated by Fig. 2.

Any suitable means may be employed for operating the platen J to feed the paper around it, and means should also be employed for throwing the dogs out of action in order to adjust the platen carriage back and forth on the carriage bed. As one embodiment of means for moving the dogs out of action, a yoke Y is represented, the ends of which are pivoted on the ends of the carriage, one end of said yoke having a finger piece *y*. The longitudinal member of the yoke ranges lengthwise of the carrier below the paper clamp, and this member is adapted to act against the dog O, so as to throw the dog carrier out of position and free both of the dogs from engagement with the rack.

Changes in the form, size, proportion, and minor details in construction may be made without departing from the spirit of the invention or sacrificing any of the advantages thereof, and I therefore, reserve the right to make such alterations and modifications as fairly fall within the scope of the invention.

Having thus fully described the invention, what is claimed as new and desired to be secured by Letters Patent is:—

1. In a visible typewriter, the combination of a keyboard, type-bars operated by the keys, a platen carriage foldable into substantially overhanging relation to the keys or the type-bars, a separable escapement-mechanism for said carriage, said escapement mechanism comprising means adapted to be actuated normally by the typewriter keys, means foldable with the platen carriage, together with means for shifting vertically the entire escapement mechanism.

2. In a visible typewriter, the combination of key-operated levers, a type-bar for each lever, a platen carriage foldable forward into substantially overhanging relation to the keys or the type-bars, a carriage-tension mechanism for actuating said platen carriage, a separable escapement-mechanism for said carriage, said escapement mechanism comprising means adapted to be actuated normally by the typewriter keys and means foldable with the platen carriage, said last-mentioned means operating to hold the platen-carriage against movement under the action of a carriage-tension device when said carriage is folded to a non-working position, together with means for shifting the platen carriage and the entire escapement mechanism vertically.

3. In a visible typewriter, the combination of key-operated levers, a type-bar for each lever, a platen carriage foldable into substantially overhanging relation to the keys or the type-bars, a separable escapement mechanism for said carriage, said escapement mechanism comprising means adapted to be actuated normally by the typewriter keys and means foldable with the platen carriage, said escapement mechanism means on said carriage being adapted for coöperation with the key-actuated means of said escapement mechanism when the carriage is restored to a working position, together with means for shifting the platen carriage and the entire escapement mechanism vertically.

4. In a visible typewriter, the combination of key-operated levers, a type-bar for each lever, a platen carriage foldable into substantially overhanging relation to the keys or type-bars, a rack and a dog-carrier foldable with the carriage, dogs on said carrier, key-actuated means coöperating with said dog-carrier, said key-actuated means being unaffected by the folding movement of the carriage and the dog-carrier and adapted to be engaged automatically with the dog-carrier when the carriage is moved into position for use, together with means for shifting the platen carriage, rack, dog-carrier, dogs and key-actuated means vertically.

5. In a visible typewriter, the combination of key-operated levers, a type-bar for each lever, a platen carriage foldable into substantially overhanging relation to the keys or type-bars, a rack foldable with the carriage, a dog-carrier movable with said foldable carriage and provided with dogs which remain in coöperative relation to the rack when the carriage is folded and unfolded, separable key-actuated means adapted to coöperate with the dog-carrier when the carriage is in working position, together with means for shifting the platen carriage, rack, dog-carrier and key-actuated means vertically.

6. In a visible typewriter, key-operated levers, a type-bar for each lever, a platen carriage foldable into substantially overhanging relation to the keys or type-bars, key-actuated means for an escapement mechanism, a rack on the carriage, and a dog carrier coöperating with said rack and with said key-actuated means, said dog carrier having a predetermined relation to the aforesaid key-actuated means for engagement therewith, and disengagement therefrom, when the carriage is adjusted to its working and folded positions, respectively, and means for shifting the platen carriage, dog carrier, and key-actuated means vertically.

7. In a visible typewriter, key-operated levers, a type-bar operated by each lever, a carriage bed foldable into substantially overhanging relation to the keys or type-bars, a platen carriage movable endwise on the carriage bed and foldable therewith, a separable escapement mechanism for said platen carriage, key-actuated means for said escapement mechanism, the said escapement mechanism being movable with the carriage bed into and out of engagement with an element of the key-actuated means, and means for moving the platen carriage, bed and the entire escapement mechanism in a vertical direction.

8. In a visible typewriter, type, key-operated means for the type, a carriage bed foldable from a normal to an abnormal and more compact position, a platen carriage adapted to travel thereon, a rack, a dog-carrier on said carriage bed and movable therewith in its foldable movement, separable key-actuated means adapted to coöperate with the dog-carrier in the normal position only of the carriage, and means for giving a relative shifting movement between the platen carriage and type.

9. In a typewriter, a carriage bed foldable from a normal to an abnormal and more compact position, a platen carriage adapted to travel thereon, a rack movable with the platen carriage, a dog-carrier mounted on the carriage bed and provided with dogs to engage with the rack, and key-actuated means for engagement with the dog-carrier.

10. In a visible typewriter, a carriage bed foldable from a normal to an abnormal and more compact position, a platen carriage adapted to travel thereon, a rack movable with the platen carriage, a dog-carrier mounted on the carriage bed and provided with dogs to engage with the rack, and a rocking key-actuated frame having means for coöperation with the dog-carrier and separable therefrom during the folding movement of the carriage bed.

11. In a typewriter, a foldable or shiftable carriage bed, a platen carriage adapted to travel thereon, a rack movable with the platen carriage, a dog-carrier mounted on the carriage bed and provided with dogs to engage with the rack, a vertically movable rocking frame adapted to be operated at all times by the typewriter keys, and a tappet mounted on the frame and coöperating with the dog-carrier.

12. In a front-strike typewriter, a carriage bed, a traveling carriage thereon, means for shifting the carriage bed vertically, and an escapement mechanism comprising key-actuated means adapted for adjustment vertically and to maintain coöperative relation to the platen carriage.

13. In a front-strike typewriter, a carriage bed, a traveling carriage thereon, separate devices for shifting the carriage bed vertically for different predetermined distances, and escapement mechanism having key-actuated means adapted for adjustment vertically and to maintain a coöperative relation to said platen carriage.

14. In a front-strike typewriter, a carriage bed, a traveling carriage thereon, separate devices for shifting the carriage bed vertically for different predetermined distances, an escapement mechanism, spacing and type-bar keys, and means coöperating with all the keys and the escapement mechanism in whatever position the platen carriage may be shifted.

15. In a front-strike typewriter, a carriage bed, a traveling carriage thereon, separate devices for shifting the carriage bed vertically for different predetermined distances, an escapement member on the carriage bed, a rocking tappet coöperating with said member, and key-actuated means for said tappet.

16. In a front-strike typewriter, a platen carriage having a rack, a dog-carrier, a rocking frame having a tappet in coöperative relation to the dog-carrier, means for adjusting the platen carriage and the frame vertically, key-levers, a universal bar actuated thereby, and bell-crank connections between the universal bar and the rocking frame.

17. In a front-strike typewriter, a platen-carriage having a rack, a dog-carrier, a rocking frame having a tappet in coöperative relation to the dog-carrier, key-levers, type-bars, a spacing key, a universal bar cooperating with the key-levers and spacing levers, separate case levers arranged to elevate the platen carriage and the rocking frame, means between the universal bar and the rocking frame for actuating the tappet at different points in the elevation of the platen carriage, and means whereby the platen carriage may be moved forward out of the path of the type-bars into a more compact position than when in use.

18. In a typewriter, key-operated type-bars, a platen carriage normally in the path of said type-bars and adapted to be folded to a position out of coöperative relation to said type-bars, and a separable escapement mechanism comprising a plurality of elements, certain of which are normally in cooperative relation to the key-actuated type-bars, other elements of said escapement mechanism being foldable with said platen carriage when it is adjusted into and out of the aforesaid coöperative relation to the key-operated type-bars.

19. In a typewriter, type-bars, a platen carriage adapted to lie in the path of said type-bars and foldable from said position into a compact relation to another part of the typewriter when not in use, an escapement mechanism, and means for actuating said escapement mechanism to control the step-by-step movement of said platen carriage, said escapement mechanism comprising coöperating devices which are separable when said carriage is adjusted to a position out of the path of the type-bars.

20. In a visible typewriter, the combination with key-levers and type-bars operated by said key-levers, of a platen normally in the path of said type-bars and movable out of the path of the type-bars into compact relation to another part of the typewriter when not in use, and feed mechanism cooperating with the platen and the key-levers when the latter are moved to operate the platen for letter spacing.

21. In a visible typewriter, key-levers, type-bars operated by said levers, a vertically movable platen normally in the path of said type-bars and bodily movable forward out of the path of the type-bars into compact relation to another part of the typewriter to occupy less space than when in use, and separable feed mechanism coöperating with the key-levers and operating to move the platen only when the latter is in its normal position.

22. In a visible typewriter, the combination with key-levers and type-bars operated by said key-levers, of a platen normally in the path of said type-bars and foldable bodily out of the path of the type-bars into a compact relation to another part of the typewriter when not in use, and a separable feed mechanism a part only of which is foldable with the platen and the other parts of said mechanism being independent of such folding movement and coöperating with the key-levers to move the platen for letter spacing and only when the latter is in its normal position.

23. In a typewriter, the combination with key-levers and type-bars operated by said key-levers, of a platen normally in the path of said type-bars and foldable into a compact relation to another part of the typewriter out of the path of the type-bars when not in use, propelling mechanism for moving the platen in a direction lengthwise thereof and bodily foldable with the platen, and separable escapement mechanism coöperating with the platen and the key-levers when the latter are moved to operate the platen for letter spacing.

24. In a typewriter, key-levers, type-bars operated by said levers, a vertically movable platen normally in the path of said type-bars and bodily movable into compact relation to another part of the typewriter to occupy less space than when in use, propelling mechanism for moving the platen in one direction and bodily movable therewith, and escapement mechanism coöperating with the key-levers and operating to move the platen only when the latter is in its normal position.

25. In a typewriter, the combination with key-levers and type-bars operated by said key-levers, of a vertically movable platen normally in the path of said type-bars and bodily movable out of the path of the type-bars into a more compact relation to another part of the typewriter when not in use, propelling mechanism for moving the platen in one direction and partaking of the compact movement thereof, and a separable escapement mechanism a part only of which partakes of the compact movement of the platen and the other parts of said mechanism being independent of such compact movement and normally coöperating with the key-levers to move the platen for letter spacing and only when the latter is in its normal operative position.

26. In a typewriter, the combination with a support, of a platen mounted on said support, key-levers, spacing levers having slotted ends, feed mechanism for moving the platen for letter spacing, bell-crank levers forming a part of said feed mechanism and pivoted to the sides of the machine, and a universal bar extending over the key-levers and guided in the slotted ends of the spacing levers and supported by said bell-crank levers.

27. In a typewriter, the combination with a support, of a platen mounted on said support, key-levers, spacing levers having slotted ends, a universal bar extending over the key-levers and guided in the slotted ends of the spacing levers, and means coöperating with the universal bar to operate the platen for letter spacing.

28. In a typewriter, the combination with a vertically movable platen, of feed mechanism for imparting a step-by-step movement to said platen and including a vertically moving rocking frame, pivotally held bell-crank levers connected to said rocking frame, a universal bar, links connecting the universal bar to the bell-crank levers, together with space levers having upturned slotted ends serving as a guide for said universal bar and adapted to operate said bar to move the rocking frame.

29. In a typewriter, the combination with a movable platen, of means for shifting the platen to different vertical positions, arms movable vertically with the platen, key-levers, and means including bell-crank levers operatively connecting the key-levers to the arms for operating said arms.

30. In a typewriter, the combination with a platen movable in two directions, of arms movable with the platen during one of the movements only, a transverse bar connected to said arms, a plurality of key-levers, and means operated by the key-levers to rock the arms and bar.

31. In a typewriter, the combination with a platen carriage movable in two directions, of arms movable with the platen carriage during one of the movements only, a plurality of key-levers, and a universal bar connected to said arms and located over said levers.

32. In a typewriter, the combination with a support, of a carriage mounted on said support, a carriage bed arranged on the support along which the carriage is adapted to travel and movable from a normal to an abnormal position and into a more compact relation to another part of the machine, key-levers, a rack bar movable with the carriage, an escapement mechanism having a spring-actuated drum tending normally to force the carriage in one direction and partaking of the compact movement of the carriage, an arm pivotally held under the carriage bed, a spring normally forcing the arm in one direction, fixed and pivotally held pawls carried by the arm so as to be moved transversely of the rack bar in the arc of a circle, and means for operating the arm to permit the carriage to have a step-by-step movement.

33. In a typewriter, the combination with a support, of a carriage mounted on said support, a carriage bed arranged on the support along which the carriage is adapted to travel and movable from a normal to an abnormal and a more compact relation to another part of the typewriter when not in use, a rack bar movable with the carriage, an escapement mechanism having spring-actuated means tending normally to force the carriage in one direction, an arm pivotally held under the carriage bed, means carried by the arm so as to be moved transversely of the rack bar in the arc of a circle, and means independent of and separable from the arm for operating the arm only when in a normal position to permit the carriage to have a step-by-step movement.

34. In a typewriter, the combination with a shiftable carriage bed, of a carriage movable along the bed both of which are bodily movable from a normal to an abnormal position and into a more compact relation to another part of the typewriter when not in use, a rack bar movable with the carriage and provided with teeth on the under surface thereof, means normally forcing the carriage in one direction, an arm pivotally held to the carriage bed so as to swing in the arc of a circle, means carried by the arm and adapted to engage the rack bar to permit a step-by-step movement to be given to said carriage, key-levers, means separable from the said arm when the carriage bed is moved to its compact position and operatively connected to the key-levers to operate said arm when the carriage bed is in its normal position only, and means for moving the carriage bed, carriage, carriage forcing means, rack bar, arm and separable means vertically.

35. In a typewriter, the combination with a carriage having a platen mounted thereon, of letter-spacing mechanism for operating the carriage and platen, a transverse bar, means for adjusting the carriage and platen vertically, arms movable vertically with the carriage and having the ends of the transverse bar fixed thereto, said arms being provided with slots at the upper ends thereof, bell-crank levers having a projection entering the slots of said arms carrying the transverse bar, a universal bar, and links connecting the bell-crank levers to the universal bar whereby the carriage may be moved by its mechanism whatever adjustment it may be in as the said universal bar is operated.

36. In a typewriter, the combination with a carriage having a platen mounted thereon, of letter-spacing mechanism for operating the carriage and platen, means for folding the carriage and platen to a compact position, means for shifting the carriage and platen vertically, arms movable vertically with the carriage, said arms being provided with slots at the upper ends thereof, bell-crank levers having a part carried thereby entering the slots of said arms, means operated by said arms for engaging a part of the letter-spacing mechanism, a universal bar, and links connecting the bell-crank levers to the universal bar whereby the carriage may be moved by its mechanism whatever its vertical shifted position.

37. In a typewriter, the combination with a carriage having a platen mounted thereon, of letter-spacing mechanism for operating the carriage and platen, means for shifting the carriage and platen vertically, arms movable vertically with the carriage, bell-crank levers operatively connected to said vertically movable arms, and key-operated means for operating the bell-crank levers.

38. In a typewriter, the combination with a carriage having a platen mounted thereon, of letter-spacing mechanism for operating the carriage and platen, a transverse bar, means for shifting the carriage and platen vertically, arms movable vertically with the carriage and having the ends of the transverse bar fixed thereto, said arms being provided with slots at the upper end thereof, bell-crank levers pivoted adjacent to the vertically movable arms, means carried by said bell-crank levers and entering the slots of said arms, a universal bar, and links connecting the bell-crank levers to the universal bar.

39. In a typewriter, the combination with a carriage and means for moving the same vertically, of letter-spacing mechanism for the carriage, an escapement operating frame forming a part of said mechanism and having vertically movable arms, and means for rocking the arms whatever their position.

40. In a typewriter, the combination with a carriage, of letter-spacing mechanism for the carriage, means for moving the carriage laterally with respect to its letter-spacing movement, an escapement operating frame forming a part of said mechanism and having arms movable laterally with the carriage, key-levers, and means operated by the key-levers for rocking the arms of the escapement frame whatever their position.

41. In a typewriter, the combination with a carriage and means for moving the same vertically, of escapement mechanism for the carriage having an escapement frame as a part thereof, vertically movable arms forming a part of said frame, bell-crank levers operating the vertically movable arms, and means for operating the bell-crank levers.

42. In a typewriter, the combination with a carriage and means for moving the same, of escapement mechanism for the carriage having an escapement frame as a part thereof, arms forming a part of said frame, bell-crank levers operating the arms, and means for operating the bell-crank levers.

43. In a typewriter, the combination with a vertically movable carriage, of an escapement frame having vertically movable arms, a transverse bar connected to said arms, bell-crank levers having a pin-and-slot connection with said arms, a universal bar, a plurality of key-levers for operating said latter bar, and links connecting the universal bar to the bell-crank levers.

44. In a typewriter, the combination with a movable carriage, of an escapement frame having arms, a transverse bar connected to said arms, levers having a pin-and-slot connection with the arms, a universal bar, a plurality of key-levers for operating said latter bar, and means connecting the universal bar to the first-mentioned levers.

45. In a typewriter, the combination with a vertically movable carriage, of an escapement frame having vertically movable arms, a transverse bar connected to said arms, bell-crank levers having a connection with said arms, a universal bar, a plurality of key-levers for operating said latter bar, and means connecting the universal bar to the bell-crank levers.

46. In a typewriter, the combination with a carriage, of letter-spacing mechanism for the carriage, means for moving the carriage laterally with respect to letter-spacing movement, an escapement operating frame forming a part of said mechanism and having arms movable laterally with the carriage, and means for rocking the arms whatever their position.

47. In a visible typewriter, the combination with a support, of a platen carriage mounted on said support, key-levers, spacing levers having slotted ends, escapement mechanism for moving the platen carriage for letter-spacing, bell-crank levers pivoted to the sides of the machine, a universal bar extending over the key-levers and guided in the slotted ends of the spacing levers and supported by said bell-crank levers, and means operated by the bell-crank levers for operating the escapement.

48. In a visible typewriter, the combination of a main frame, a platen carriage mounted to travel transversely of said frame, key-levers, spacing levers having slotted ends, a universal bar extending over the key-levers and guided in the slotted ends of the spacing levers, means coöperating with the universal bar to operate the platen carriage for letter spacing, and means whereby the platen carriage may be moved to an aonormal compact position out of letter spacing connection with the universal bar.

49. In a visible typewriter, the combination of a movable platen carriage, means for shifting the platen carriage to different vertical positions, arms movable vertically with the platen carriage, key-levers, means including bell-crank levers operatively connecting the key-levers to the arms for operating said arms, means operated by said arms to letter space the carriage, and means whereby the carriage may be moved out of letter spacing connection with said arms.

50. In a visible typewriter, the combination with a platen movable in two directions, of arms movable with the platen during one of the movements only, a transverse bar connected to said arms, a plurality of key-operated levers, means operated by the levers to rock the arms and bar, means operated by said bar to letter space the platen, and means for moving the platen to an abnormal compact position out of letter spacing connection with said arms and bar.

51. In a typewriter, the combination with a carriage having a platen mounted thereon, of letter spacing mechanism for operating the carriage and platen, means for shifting the carriage and platen vertically, arms movable vertically with the carriage, bell-crank levers operatively connected to said vertically movable arms, key-operated means for operating the bell-crank levers, and means whereby the platen carriage and a part of the escapement mechanism may be moved to an abnormal and compact position out of operative relation with said arms.

52. In a typewriter, the combination with a carriage having a platen mounted thereon, of letter spacing mechanism for operating the carriage and platen, a transverse bar, means for shifting the carriage and platen vertically, arms movable vertically with the carriage and having the ends of the transverse bar fixed thereto, said arms being provided with slots at the upper end thereof, bell-crank levers pivoted adjacent to the vertically movable arms, means carried by said bell-crank levers and entering the slots of said arms, a universal bar, and links connecting the bell-crank levers to the universal bar, and means whereby the platen and carriage may be moved to an abnormal position out of letter spacing operative relation to said transverse bar.

53. In a visible typewriter, the combination with a platen carriage and means for moving the same vertically, of letter spacing mechanism for the carriage, a frame having vertically movable arms adapted to operate said letter spacing mechanism, means for rocking the arms whatever their position, and supporting means for the platen carriage for moving the same to an abnormal compact position out of letter spacing operative relation with said frame.

54. In a visible typewriter, the combination of a platen carriage, of escapement mechanism for the carriage, means for moving the carriage laterally with respect to its letter-spacing movement, a frame having a transverse bar carrying a part of said escapement mechanism and having arms movable laterally with the carriage, key-levers, and means operated by the key-levers for rocking the arms of the frame whatever their position.

55. In a visible typewriter, the combination with a carriage and means for moving the same vertically, of escapement mechanism including a tappet for the carriage, a rocking frame, vertically movable arms forming a part of said frame, bell-crank levers operating the vertically movable arms, means for operating the bell-crank levers, and supporting means for moving the platen carriage to an abnormal position out of operative relation to said frame.

56. In a visible typewriter, the combination of a platen carriage and means for moving the same, a rocking frame, a separable escapement mechanism for the carriage adapted to be operated by said frame, arms forming a part of said frame, bell-crank levers operating the arms, and means for operating the bell-crank levers.

57. In a visible typewriter, the combination with a vertically movable platen carriage, of a frame having vertically movable arms, a transverse bar connected to said arms, bell-crank levers connected to operate said arms, a universal bar connected to operate the bell-crank levers, a plurality of key-levers for operating said bar, and separable means operated by the frame for operating said platen carriage for letter spacing when the carriage is in normal operative position and having a part thereof movable to an abnormal compact position.

58. In a visible typewriter, the combination of a platen carriage, letter spacing mechanism for the carriage, means for giving the platen carriage a case shift movement with respect to the letter spacing movement, a frame carrying a part of said mechanism and having arms shiftable with the carriage, means for rocking the arms whatever their position, and supporting means for moving the platen carriage out of its operative letter spacing relation with the frame.

This specification signed this 19th day of May, A. D. 1915.

CORONA TYPEWRITER COMPANY, INC.,
By CARLETON F. BROWN,
*Treasurer.*

Witnesses:
NORMA STEWART,
ROBERT BASTON.